Aug. 18, 1959     E. T. HERMAN     2,899,721
REFRIGERATOR DOOR SEAL
Filed Aug. 8, 1957

INVENTOR.
EUGENE T. HERMAN
BY
ATTORNEY

United States Patent Office 2,899,721
Patented Aug. 18, 1959

2,899,721

REFRIGERATOR DOOR SEAL

Eugene T. Herman, St. Marys, Ohio, assignor to The Goodyear Tire & Rubber Company, Akron, Ohio, a corporation of Ohio Application August 8, 1957, Serial No. 676,973

4 Claims. (Cl. 20—69)

This invention relates to a gasket or seal for effecting a seal between two parts and more particularly to a gasket for use on a closure member such as a refrigerator door.

Electric refrigerators in the past few years have become much more efficient and the average size being used has become greater. Resultingly, it is imperative that an effective seal be used on the door if the performance is to be maintained. In recent years, there has been considerable activity in producing refrigerators which can be opened easily from the inside by anyone including small children who might become closed in the refrigerator. In 1956, the United States Congress passed a law to accomplish this and now is identified as 15 United States Code Annotated 1211 (1956 Cum. Supp.). As a result, many of the refrigerators use magnetic catches in lieu of the positive latch structures or a mechanical latch mechanism with an over-center cam action to provide a light pull break away. Either type requires a gasket that will not only seal initially under low unit pressures (soft seal) but also maintain the seal under the same conditions. Since the sealing pressures on the gasket in many instances are much lower than those with the usual closing latches, the effect of compression set in the gasket must be kept at a minimum to avoid premature ineffectiveness of the gasket. It is therefore an object of this invention to provide a gasket that seals satisfactorily at low unit pressures.

A second object of the invention is to provide a seal that will perform satisfactorily with the new closing mechanisms that meet the requirements of the present law.

Another object of the invention is to provide a gasket that has low compression set and means to compensate for the set that does occur.

A further object of the invention is to provide a gasket that is economical to manufacture.

A still further object of the invention is to provide a gasket that requires little if any changes in the present refrigerator structure to accommodate the gasket of this invention.

Other objects and advantages of this invention will become apparent hereinafter as the description thereof proceeds, the novel features, arrangements and combinations being clearly pointed out in the specification as well as the claims thereunto appended.

Figure 1:
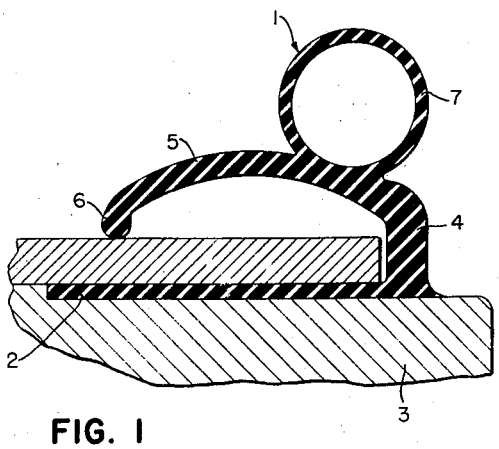
Fig. 1 is a cross-sectional view of a typical refrigerator door gasket of the invention.

The gasket 1 as seen in Fig. 1 is an extruded resilient material such as rubber, natural or synthetic, polyvinyl chloride, polyethylene, etc. Such materials are well known for forming gaskets of this type. The gasket 1 includes as shown a flange 2 which underlies the door panel 3 for positioning the gasket around the edge of the periphery of the door. The flange 2 is only representative of a means of attaching the gasket 1 to a refrigerator door, but it is understood that the particular means of attaching the gasket to the door and the particular configuration of the attaching portion of the gasket may be varied in accordance with the particular door structure.

Along one edge of the flange 2 is a rather substantial vertically extending section 4 which supports the main body of the gasket 1 and to fix the position thereof. The main body of the gasket 1 includes a laterally extending cantilever section 5 which is convexly arched and extends inwardly from the vertical section 4 toward the center of the door. The vertical section 4 joins the sealing portion of the gasket to the mounting portion into a unitary structure. The inner end 6 of the cantilever section 5 preferably rests on the inner surface of the door panel 3 and is free to move thereover as will be apparent hereinafter. A hollow tubular member 7, as shown of circular cross-section, projects outwardly from the upper surface adjacent the outer end of cantilever member 5 which lies above the vertical section 4. The walls of the tubular section 7 are relatively thin so that they will easily flex or distort when contacting the refrigerator body.

Figure 3:
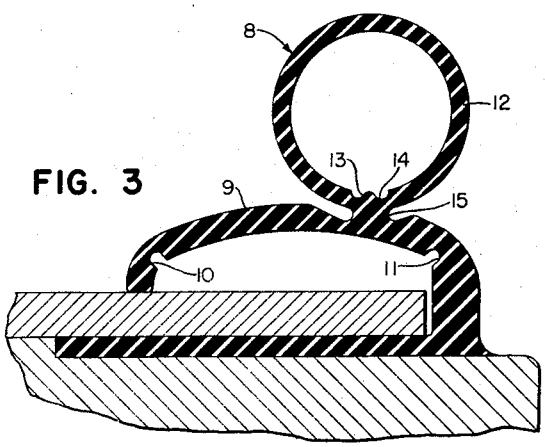
Fig. 3 is a cross-sectional view of a modification of the invention.

In the modification of the refrigerator gasket 8 shown in Fig. 3 the cantilever member 9 includes notches 10 and 11 on the inner surface near the ends to form positive flex points in order to assist in effecting a seal when the gasket is compressed against the refrigerator as the door is closed. The hollow tubular member 12 on the cantilever member 9 projects from the cantilever member and also includes a pair of adjacent notches 13 and 14 on the interior surface to control the deformation of the tubular member 12 when subjected to compression. The narrow neck portion 15 supporting the tubular member 12 provides a large amount of flexibility in the tubular member 12 so that little pressure is required to deform the gasket to create an effective seal.

Figure 4:
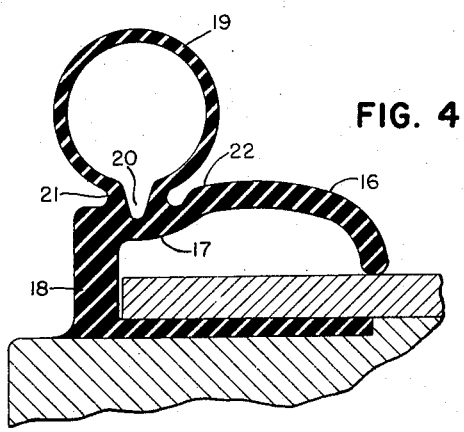
Fig. 4 is a cross-sectional view of another modification of the invention.

In the particular modification of the refrigerator gasket shown in Fig. 4, the cantilever member 16 is arched more than the others with a reverse arched section 17 joining the cantilever 16 to the vertical section 18. The hollow tubular member 19 projects from the section 17 and has a V-shaped groove 20 extending downwardly into the supporting neck 21. The structure around the groove 20 is highly flexible and as a result a very soft seal is effected. A portion of the flattened tubular member 19 is supported on the portion 22 of the cantilever member 16 adjacent section 17 to assist in maintaining sufficient sealing pressure of the tubular member 19 against the refrigerator.

As can be seen clearly from the four figures of the attached drawing, the tubular members are of appreciable size relative to the cantilever member and the attached portion of the tubular member is small relative to the total periphery of the tubular member. Thus, the peripheral length of the tubular member in the various modified forms shown in Figs. 1 to 4 is at least about as great as the length of the cantilever member. Also, the length of the portion of the tubular member which is integral with the cantilever member, i.e., the supporting necks of the tubular members, are less than about one fifth of the peripheral length of the tubular member.

Figure 2:
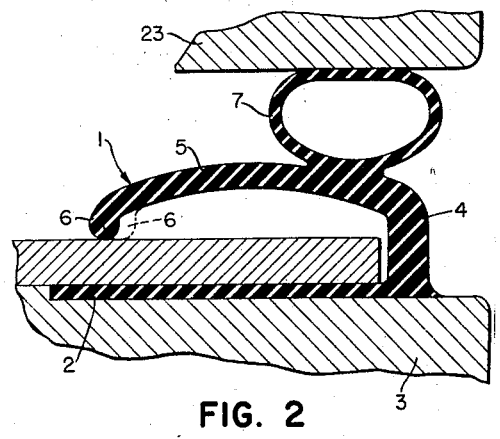
Fig. 2 is a cross-sectional view of the gasket with the door in the closed position.

For the purposes of illustration, the gasket illustrated in Fig. 1 is used in Fig. 2 to demonstrate the functioning of the cantilever and tubular members of the gasket in effecting the seal when the refrigerator door is closed. As is seen, the tubular member 7 is flattened with a substantial portion of its upper surface in direct contact with the surface of the refrigerator body 23 when the door is closed. The compression of the gasket also flattens the cantilever arm 5 to the approximate position shown in Fig. 2 so that the total compression load is distributed between the tubular member 7 and the cantilever member 5. As this takes place, the end portion 6 of the cantilever member moves laterally inwardly over the inner surface of the door panel 3 from the original position indicated. Since the load on the cantilever member 5 is transmitted thereto through the tubular member 7 adjacent the fixed end of the cantilever member 5, the unit stress in any portion of the cantilever member 5 is very small. This small unit load in the cantilever member, therefore, will introduce little compression set in the cantilever member and as compression set takes place in the tubular member 7, more of the compressive stresses are transferred to the cantilever member to effect the seal but the unit pressure to effect the seal remains low.

Since the area of contact of the tubular member 7 with the refrigerator body is relatively substantial a good seal is effected and the compression set due to the high deflection of the tubular member is offset by the reaction stresses set up in the cantilever member to maintain the effective seal for long periods of time. The exact shape of seal used for a specific refrigerator will depend upon the particular conditions that are encountered and the sections illustrated are typical modifications of the basic design. Ridges or other well-known surface configurations may be used on the contact areas of the seal if desired to assist in effecting good contact between the seal and refrigerator.

While certain representative embodiments and details have been shown for the purpose of illustrating the invention, it will be apparent to those skilled in the art that various changes and modifications may be made therein without departing from the spirit or scope of the invention.

Having thus fully described my invention what I claim and desire to secure by Letters Patent of the United States is:

1. A gasket for a refrigerator door adapted to be secured around the periphery of the door to provide a seal between the door and the refrigerator, said gasket comprising a strip of resilient material of similar cross-sectional shape throughout its length, said cross-section including a base to position and secure said strip on a door, a convexly arched, cantilever member attached only at one end to said base whereby the other end thereof is free to move laterally with respect to said base and a door to which the gasket is secured, and a closed, flexible tubular member formed integrally with said cantilever member and said base positioned adjacent said attached end of said cantilever member on the side of the cantilever portion opposite to said base, the wall thickness of said tubular member being appreciably less than the wall thickness of said cantilever member, the size of the opening in said tubular member being at least several times greater than said wall thickness of the tubular member, the peripheral length of said tubular member being at least about as great as the length of said cantilever member, and the length of the portion of the wall of the tubular member which is integral with the cantilever member being less than one fifth of said peripheral length of said tubular member, said geometric arrangement between said tubular member and said cantilever member causing the tubular member to be appreciably flattened prior to any substantial deformation of the cantilever member when the door of the refrigerator upon which the gasket is attached is closed upon the gasket.

2. A gasket for a refrigerator door adapted to be secured around the periphery of the door to provide a seal between the door and the refrigerator, said gasket comprising a strip of resilient material of similar cross-sectional shape throughout its length, said cross-section including a base to position and secure said strip on a door, a convexly arched, solid cantilever member attached only at one end to said base whereby the other end thereof is free to move laterally with respect to said base and a door to which the gasket is secured, and a closed, flexible tubular member of substantially circular section formed integrally with said cantilever member and said base positioned adjacent said attached end of said cantilever member on the side of the cantilever portion opposite to said base, the wall thickness of said tubular member being appreciably less than the wall thickness of said cantilever member, the diameter of said circular tubular member being at least several times greater than said wall thickness of the tubular member, the circumference of said tubular member being at least as great as the length of said cantilever member, and the length of the portion of the wall of the tubular member which is integral with the cantilever member being less than one-fifth of the circumference of said tubular member, said geometric arrangement between said tubular member and said cantilever member causing the tubular member to be appreciably flattened prior to any substantial deformation of the cantilever member when the door of the refrigerator upon which the gasket is attached is closed upon the gasket.

3. A gasket as claimed in claim 2 wherein there are a pair of adjacent notches in the interior surface of the wall of said tubular member within said integral portion thereof, said notches serving to control deformation of the tubular member when it is subjected to compression.

4. A gasket as claimed in claim 2 wherein there is a V-shaped groove extending downwardly from the interior of said tubular member into the portion of the cantilever member which is integral with the tubular member, said groove serving to modify the flexibility characteristics of said tubular member.

References Cited in the file of this patent

UNITED STATES PATENTS

| | | |
|---|---|---|
| 2,528,705 | Norrish | Nov. 7, 1950 |
| 2,640,230 | Eck et al. | June 2, 1953 |
| 2,665,456 | Morton | Jan. 12, 1954 |